US011210956B2

(12) United States Patent
Nilsson et al.

(10) Patent No.: US 11,210,956 B2
(45) Date of Patent: Dec. 28, 2021

(54) METHOD FOR DIRECTING AN UNMANNED AERIAL VEHICLE TO A DESTINATION

(71) Applicant: Telefonaktiebolaget LM Ericsson (publ), Stockholm (SE)

(72) Inventors: Andreas Nilsson, Gothenburg (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 257 days.

(21) Appl. No.: 16/463,228

(22) PCT Filed: Nov. 24, 2016

(86) PCT No.: PCT/EP2016/078643
§ 371 (c)(1),
(2) Date: May 22, 2019

(87) PCT Pub. No.: WO2018/095528
PCT Pub. Date: May 31, 2018

(65) Prior Publication Data
US 2019/0295426 A1    Sep. 26, 2019

(51) Int. Cl.
*B64C 39/02* (2006.01)
*G08G 1/16* (2006.01)
(Continued)

(52) U.S. Cl.
CPC ......... *G08G 5/0039* (2013.01); *B64C 39/024* (2013.01); *G05D 1/0005* (2013.01);
(Continued)

(58) Field of Classification Search
CPC .. G08G 5/0039; G08G 5/0026; G08G 5/0069; G08G 1/20; G08G 5/0013;
(Continued)

(56) References Cited

U.S. PATENT DOCUMENTS 9,773,421 B2 * 9/2017 Wang ................... G08G 5/0008
9,798,329 B2 * 10/2017 Shattil .................... G05D 1/104
(Continued)

OTHER PUBLICATIONS

International Search Report and Written Opinion issued in International Application No. PCT/EP2016/078643, dated Jul. 25, 2017, (11 pages).
(Continued)

*Primary Examiner* — Yonel Beaulieu
(74) *Attorney, Agent, or Firm* — Rothwell, Figg, Ernst & Manbeck, P.C.

(57) ABSTRACT

A method (20) performed in a network entity (4, 11, 12) is provided for directing an unmanned aerial vehicle (2) to a destination. The method (20) comprises obtaining (21) route information for at least a first vehicle (3a, 3b) and for the unmanned aerial vehicle (2), establishing (22), based on the route information, that a criterion for co-traveling with the first vehicle (3a, 3b) is fulfilled, and transmitting (23), to the unmanned vehicle (2), information enabling the unmanned aerial vehicle (2) to co-travel with the first vehicle (3a, 3b). Methods in an unmanned aerial vehicle and in a network entity, and an unmanned aerial vehicle, network entity, computer programs and computer program products are also provided.

21 Claims, 4 Drawing Sheets

(51) Int. Cl.
  *G08G 5/00* (2006.01)
  *G05D 1/00* (2006.01)
  *G08G 1/00* (2006.01)
  *G06Q 10/04* (2012.01)
(52) U.S. Cl.
  CPC ............. *G06Q 10/047* (2013.01); *G08G 1/20* (2013.01); *G08G 5/0013* (2013.01); *G08G 5/0026* (2013.01); *G08G 5/0034* (2013.01); *G08G 5/0043* (2013.01); *G08G 5/0069* (2013.01); *B64C 2201/128* (2013.01); *B64C 2201/146* (2013.01)
(58) Field of Classification Search
  CPC ...... G08G 5/0034; G08G 5/0043; G08G 1/16; G08G 5/00; G06Q 10/047; B64C 39/024; B64C 2201/128; B64C 2201/146; G05D 1/0005
  See application file for complete search history.

(56) References Cited

U.S. PATENT DOCUMENTS

| | | | |
|---|---|---|---|
| 9,892,647 B2* | 2/2018 | Papageorgiou | G08G 5/065 |
| 10,586,464 B2* | 3/2020 | Dupray | H04B 7/18504 |
| 11,031,996 B2* | 6/2021 | Nilsson | B64C 39/024 |
| 11,091,262 B2* | 8/2021 | Wu | B64C 1/30 |
| 2016/0107750 A1 | 4/2016 | Yates | |
| 2016/0196756 A1 | 7/2016 | Prakash et al. | |
| 2016/0200438 A1 | 7/2016 | Bokeno et al. | |
| 2018/0039287 A1* | 2/2018 | Shattil | H04B 7/024 |
| 2018/0137454 A1* | 5/2018 | Kulkarni | G08G 5/0034 |
| 2018/0181125 A1* | 6/2018 | Ceccom | G08G 5/0008 |
| 2018/0293898 A1* | 10/2018 | Redmann | G08G 5/006 |
| 2019/0100314 A1* | 4/2019 | Prager | B64D 1/22 |
| 2019/0193856 A1* | 6/2019 | Prager | B66C 1/425 |
| 2021/0163149 A1* | 6/2021 | Bosma | B64D 3/00 |
| 2021/0224739 A1* | 7/2021 | Sweeny | G06Q 10/0838 |

OTHER PUBLICATIONS

Wikipedia, Unmanned aerial vehicle, available at https://web.archive.org/web/20161119112130/https://en.wikipedia.org/wiki/Unmanned_aerial_vehicle, last modified Nov. 19, 2016 (33 pages).

ABI Research, "Small Unmanned Aerial Systems Market Exceeds US$8.4 Billion by 2019, Dominated by the Commercial Sector and Driven by Commercial Applications," Jan. 5, 2015 (2 pages).

Place, W.D., U.S. postal service shortlists 'HorseFly' octocopter drone delivery service—Blog—Naval Postgraduate School, Consortium for Robotics and Unmanned Systems Education and Research (CRUISER), https://my.nps.edu/web/cruiser/blog/-/blogs/u-s-postal-service-shortlists-horsefly-octocopter, Apr. 21, 2015, (2 pages).

* cited by examiner

METHOD FOR DIRECTING AN UNMANNED AERIAL VEHICLE TO A DESTINATION

CROSS REFERENCE TO RELATED APPLICATION(S)

This application is a 35 U.S.C. § 371 National Stage of International Patent Application No. PCT/EP2016/078643, filed Nov. 24, 2016, designating the United States.

TECHNICAL FIELD

The technology disclosed herein relates generally to the field of unmanned aerial vehicles, and in particular to methods for directing an unmanned aerial vehicle to a destination, method for increased efficiency in reaching a destination, network entity, unmanned aerial vehicle, computer programs and computer program products.

BACKGROUND

Unmanned aerial vehicles (UAV), often denoted drones, are becoming more and more common and used for various purposes. Drones may, for instance, be used in aerial surveillance, professional aerial surveying, commercial and motion picture filmmaking, news gathering for journalism, observation by police forces, search and rescue operations, scientific research, disaster relief, cargo transportation etc. The small unmanned-aircraft-systems are rapidly becoming a large market, including services and applications. It is foreseen that there will also be many other types of unmanned vehicles besides the UAVs, such as for instance self-driving trucks, cars, trains, busses and boats.

One particular example of an application for drones is the delivery of mail and packages to remotely located areas. For example, in some parts of the world on-line retailers use drones for delivering packages and in other parts of the world drones are used for delivering mail.

Drones may be battery-powered and/or fuel powered, i.e. carries batteries and/or fuel, and since the drones are relatively small their range is therefore limited. A problem when the drones are intended for use in businesses involving longer distances is therefore the risk of drained batteries or risk of running out of fuel. Further, the travel time for the drones may be too long for meeting requirements such as delivery times.

SUMMARY

An objective of the present teachings is to address and improve various aspects for unmanned vehicles and in particular for unmanned aerial vehicles. A particular objective is to enable time and energy savings for such vehicles. This objective and others are achieved by the methods, devices, computer programs and computer program products according to the appended independent claims, and by the embodiments according to the dependent claims.

The objective is according to an aspect achieved by a method in a network entity for directing an unmanned aerial vehicle to a destination. The method comprises obtaining route information for at least a first vehicle and for the unmanned aerial vehicle; establishing, based on the route information, that a criterion for co-traveling with the first vehicle is fulfilled, and transmitting, to the unmanned vehicle, information enabling the unmanned aerial vehicle to co-travel with the first vehicle.

By means of the method, unmanned aerial vehicles are enabled to travel more efficiently, in particular enabled to save time as well as energy. The unmanned aerial vehicle may travel longer distances and often also in a more time-efficient way. Further, the co-traveling possibility may also be beneficial in view of environmental influence.

The objective is according to an aspect achieved by a computer program for a network entity. The computer program comprises computer program code, which, when run on at processing circuitry of the network entity causes the network entity to perform the method as above.

The objective is according to an aspect achieved by a computer program product comprising a computer program as above and a computer readable means on which the computer program is stored.

The objective is according to an aspect achieved by a network entity for directing an unmanned aerial vehicle to a destination. The network entity is configured to obtain route information for at least a first vehicle and for the unmanned aerial vehicle, establish, based on the route information, that a criterion for co-traveling with the first vehicle is fulfilled, and transmit, to the unmanned vehicle, information enabling the unmanned aerial vehicle to co-travel with the first vehicle.

The objective is according to an aspect achieved by a method performed in an unmanned aerial vehicle for increased efficiency in reaching a destination. The method comprises providing route information to a network entity, receiving, from the network entity, information enabling co-traveling with a first vehicle, and initiating, based on the received information, co-traveling with the first vehicle for at least part of a remaining distance to the destination.

The objective is according to an aspect achieved by a computer program for an unmanned aerial vehicle. The computer program comprises computer program code, which, when run on at processing circuitry of the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle for increased efficiency in reaching a destination. The unmanned aerial vehicle is configured to provide route information to a network entity, receive, from the network entity, information enabling co-traveling with a first vehicle, and initiate, based on the received information, co-traveling with the first vehicle for at least part of a remaining distance to the destination.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, a communications network (e.g. 4G or 5G), or a network entity thereof, obtains information about unmanned and/or manned vehicles and their travelling routes. Based on this knowledge, the unmanned vehicles (in particular unmanned aerial vehicle) may be redirected to land and dock onto other vehicles (unmanned or manned) such as, e.g., trucks, traveling along a route that is in common for them both. If the unmanned vehicle co-travels with the other vehicle in such way for at least a period of time it can save energy and time. This may be viewed as a "network organized drone hitchhiking".

Figure 1:
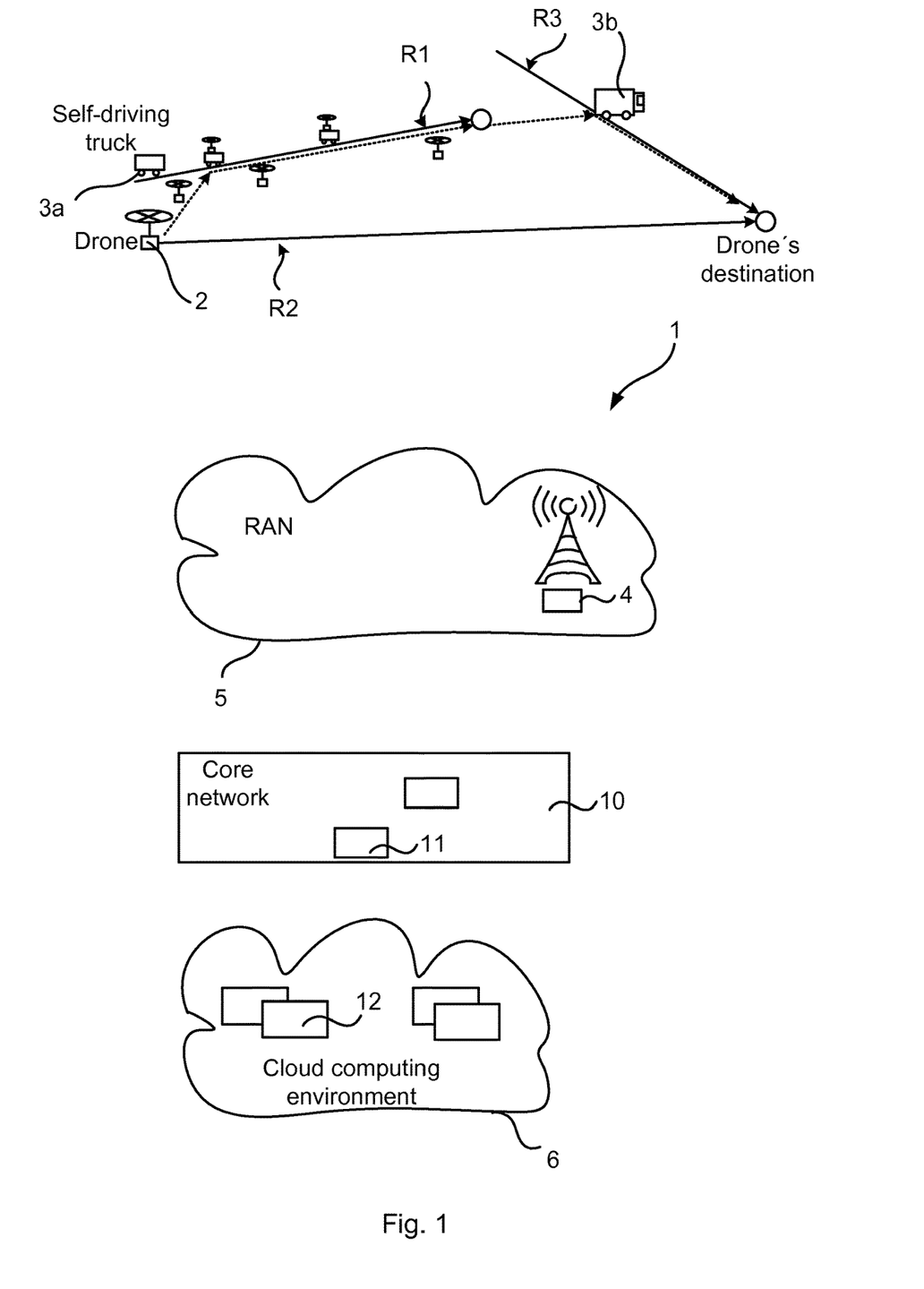
FIG. 1 illustrates an environment in which embodiments according to the present teachings may be implemented.

FIG. 1 illustrates a system in which embodiments according to the present teachings may be implemented. There are, as mentioned, various types of unmanned vehicles, for example of unmanned aerial vehicles 2, in the following also denoted drone 2. FIG. 1 also illustrates other vehicles 3a, 3b, which may be another type of unmanned vehicle, e.g. a self-driving truck 3a, or a more conventional vehicle 3b driven by a driver.

The drone 2 may be provided with a communication unit such that it is able to communicate in a communications system 1, e.g. with network node thereof. In FIG. 1 the communications system 1 is illustrated comprising a number of network nodes and/or network entities. The communications system 1 comprises a wireless access network 5, which may, for instance, be a 2G, 3G, 4G or 5G cellular radio access network (as a particular example Long Term Evolution, LTE, can be mentioned). The wireless access network 5 in turn comprises a number of network nodes 4 (e.g. radio access nodes). The communications system 1 may also comprise a core network 10 comprising core network nodes 11 (also denoted backbone nodes), such as e.g. mobility management nodes or subscriber databases. The communications system 1 may comprise, have access to or be interconnected with other network elements, for instance, network nodes 12 of a cloud computing environment 6 comprising a number of cloud computing nodes 12, or other packet data network, such as Internet.

The network node 4 of the wireless access network 5 (in the figure indicated as radio access network, RAN) may provide and control one or more respective coverage area(s), often denoted cell(s) C1, C2. Further, the network node 4 may have wireless communication with drones 2 that have the mentioned communication unit for receiving such signaling and transmitting signaling according to the access technology at hand. The network node 4 may implement different wireless access technologies, such as 3G, 4G, LTE or 5G, to mention a few examples. Further, the network node 4 may be denoted in different ways depending on standards implemented in the communications system 1. For instance, while an access node handling the wireless communication with devices is known as base transceiver station (BTS) in Global System for Mobile Communications (GSM), it is known as evolved Node B or eNB in Long Term Evolution (LTE) systems. These network nodes 4 typically provide wireless communication for communication devices e.g. user equipment (UE). The network node 4 may also, according to embodiments of the present teachings, communicate wirelessly with drones 2 equipped with a communication module adapted to the wireless communication standard used in the communications system 1. The drone communication can be based, for instance, on LTE (or 5G), on Vehicle-to-everything (V2X) communication, or similar with both network assisted and direct Device-to-Device (D2D) communication.

The vehicle(s) 3a, 3b with which the drone 2 may co-travel may be an unmanned vehicle 3a, e.g. a self-driving truck or a conventional vehicle 3b. The line indicated by R1 describes a route of the first vehicle 3a, and the line indicated by R3 describes a route of a second vehicle 3b. The line indicated by R2 describes the route of a drone 2 as initially planned, i.e. when not implementing a method according to the present teachings. This route R2 may typically be the shortest path between the starting point and destination point. The dotted lines show the route for the same drone 2 when implementing the method according to the present teachings. In particular, a network entity 4, 11, 12 of the communications system 1 is assumed to have knowledge of the routes of the first vehicle 3a, of the second vehicle 3b and of the drone 2. The network entity 4, 11, 12 evaluates if it would be beneficial for the drone 2 to co-travel with the first vehicle 3a and/or the second vehicle 3b for some distance in order to save time and/or energy for the drone 2. If this is confirmed, the network entity 4, 11, 12 calculates a new route for the drone 2 such that it meets up with the first vehicle 3a somewhere on the first vehicle's 3a route R1. The drone 2 is redirected such as to co-travel with the first vehicle 3a, and the drone 2 may land on the first vehicle 3a, e.g. at a docking station on the roof of the first vehicle 3a. The drone 2 then co-travels with the first vehicle 3a until a position where the network entity 4, 11, 12 has instructed the drone 2 to leave the first vehicle 3a again. From there the drone 2 may fly directly to its intended destination or co-travel with a second vehicle 3b (the latter shown in FIG. 1).

Although the initially planned route R2 for the drone 2 may be the shortest, it is not necessarily the fastest. The drone 2 may for instance have a lower speed than e.g. a vehicle on the road and the drone 2 may save transport time by co-traveling with the vehicle 3a, 3b. In other instances the drone 2 may not be able to reach a destination (even if traveling the shortest path) due to risk of running out of e.g. battery or fuel, and therefore benefit from the co-traveling.

Figure 2:
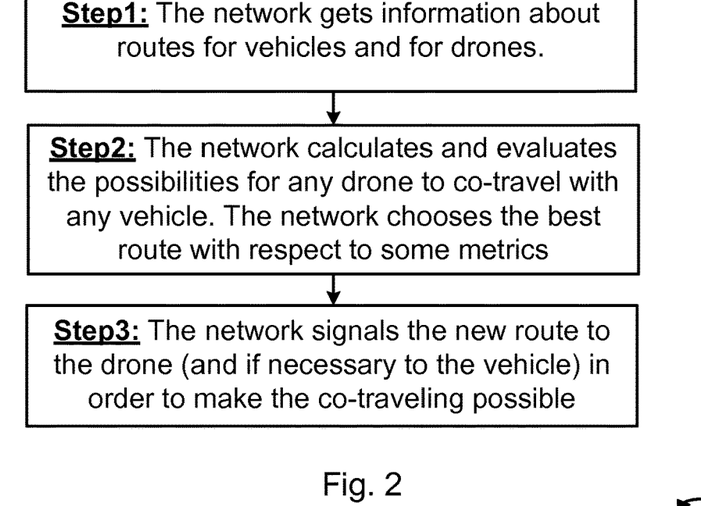
FIG. 2 is a flow chart of embodiments according to the present teachings.

FIG. 2 illustrates a flow chart of an embodiment of the method according to the present teachings. In step 1 the network entity 4, 11, 12 gathers information about routes of vehicles 3a, 3b and drones 2. The network entity 4, 11, 12 may in this step also find out which vehicles 3a, 3b accept to be used for co-traveling. In order for the drone 2 to not fall off the vehicles 3a, 3b, the drone 2 may temporarily fix itself to the vehicle 3a, 3b for example by means of suction cups or magnetic undercarriage or the like. In other embodiments the vehicle 3 is equipped with a docking station suitable for drones 2.

In step 2 the network entity 4, 11, 12 evaluates if there are any benefits with a drone 2 co-traveling with any vehicle 3a, 3b. In some embodiments this evaluation is done in a cloud environment. The evaluation can, for example, be performed by letting the network entity 4, 11, 12 calculate all possible different routes for the drone 2 (including the co-traveling) and then choose the most suitable with respect to some metric, such as, for example, time consumption, energy consumption etc.

In step 3 the network entity 4, 11, 12 signals the new route to the drone 2 (if it is on its way already), which is hence redirected. The route may also be planned beforehand, i.e. before the drone 2 takes off. The route planning and route directing of the drone 2 may be dynamically changed. If necessary the network entity 4, 11, 12 may also signal some instructions to the vehicle 3a, 3b, for example to slow down or park during the landing of the drone 2.

In some embodiments the docking station on the vehicle 3a, 3b comprises an energy charger by means of which the drone 2 may charge its batteries, hence extending its range.

In other embodiments the new drone route comprises co-traveling with multiple different vehicles 3a, 3b in order to optimize the time and/or energy consumption for the drone 2.

In some embodiments, the drone 2 can move from a first vehicle 3a to a second vehicle 3b since the network entity 4, 11, 12 may establish that the drone 2 can arrive closer to its final destination by combining the routes of different vehicles 3a, 3b.

In some embodiments, the drone 2 can be directed to drop off e.g. a packet on a vehicle 3a, 3b, which is then picked up by a second drone at another location. The second drone may be instructed to deliver the packet to its final destination or placing it on another vehicle along a pre-calculated route. A total route may thus be pre-calculated for a packet, wherein the total route may comprise one or more drones. The pre-calculated route may be dynamically changed; the network entity 4, 11, 12 may for instance obtain data relating to the traffic situation along the route and determine that although a drone would save energy by co-traveling with a bus or lorry, a delivery time cannot be met due to a traffic congestion. The network entity 4, 11, 12 may therefore dynamically changed the pre-calculated route.

It is noted that although the embodiments thus far has been described in relation to an unmanned aerial vehicle, the teachings are applicable also for other types of unmanned vehicles.

The various features and embodiments that have been described can be combined in many different ways, examples of which are given in the following with reference first to FIG. 3.

Figure 3:
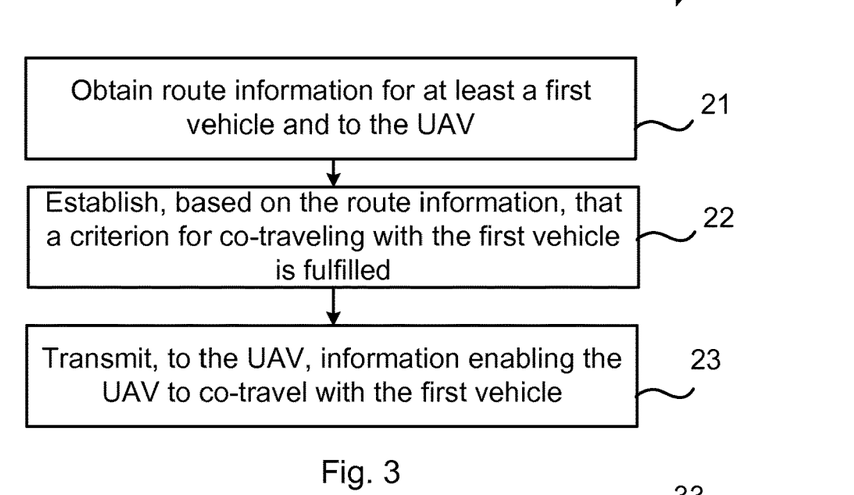
FIG. 3 illustrates a flow chart over steps of an embodiment of a method in a network entity in accordance with the present teachings.

FIG. 3 illustrates a flow chart over steps of an embodiment of a method in a network entity in accordance with the present teachings.

The method 20 may be performed in a network entity 4, 11, 12 for directing an unmanned aerial vehicle (2) to a destination. The method 20 may, for instance, be performed in a radio access node (e.g. eNB), in an entity (e.g. cloud computing node) of a cloud computing environment 6 or in another network entity, e.g. in a core network 10. In other embodiments the method 20 is performed in a distributed manner involving several network nodes. In such embodiments, some steps are performed in a cloud computing node (e.g. obtaining route information and establishing fulfilment of criterion or criteria) and the actual transmitting may be performed in a radio access node.

The method 20 comprises obtaining 21 route information for at least a first vehicle 3a, 3b and for the unmanned aerial vehicle 2. In preferred embodiments, route information is obtained for several vehicles. The larger the number of vehicles that accept a co-traveling unmanned aerial vehicle is, the more possibilities there are to find routes that give the desired advantages, e.g. reduced energy consumption and total travel time for the unmanned aerial vehicle. The route information may be combined in many different ways, for optimizing e.g. the travel time of the unmanned aerial vehicle. For instance, the unmanned aerial vehicle may co-travel with a first vehicle 3a, 3b to a first destination and then co-travel with a second vehicle for the rest of the way or parts of the way to the final destination.

The method 20 comprises establishing 22, based on the route information, that a criterion for co-traveling with the first vehicle 3a, 3b is fulfilled. The criterion may, for instance, be that fuel savings that is enabled by the co-traveling is above a certain threshold, or that the time savings enabled by the co-traveling is above a certain threshold.

The method 20 comprises transmitting 23, to the unmanned vehicle 2, information enabling the unmanned aerial vehicle 2 to co-travel with the first vehicle 3a, 3b. The transmitting 23 comprises a transmission between the network entity performing the method 20 and the unmanned vehicle 2 irrespective of whether there are intermediate nodes between them. Thus, depending on the entity in which the method 20 is implemented, the transmitting may be a direct transmission between the network entity 4, 11, 12 and the unmanned vehicle 2, in other embodiments the transmitting comprises initiating or triggering the transmission of the information. For instance, in embodiments wherein the method 20 is implemented in a cloud computing node, the cloud computing node may perform the transmitting 23 via various intermediate nodes. The cloud computing node may then be seen as initiating the last link of transmission of information (last link being from a radio access node to the unmanned vehicle 2) by sending the information to this radio access node (possibly via various other nodes).

The method 20 provides several advantages, as has been described. For instance, the method 20 enables reduction of time and energy consumption of unmanned aerial vehicles by allowing them to co-travel with other vehicles for part of a route between a starting point and a destination.

In some embodiments, the establishing 22 comprises determining that one or both of a time saving and energy saving is obtained when co-traveling with the first vehicle 3a, 3b for at least part of remaining distance to the destination. As has been described, the criteria for co-traveling with the first vehicle 3a, 3b (and possibly other vehicles) may be that the time saving is above a certain threshold, that a arrival time is met, that the possible energy saving is above a certain threshold, etc.

In various embodiments, the establishing 22 comprises:
calculating at least one route from a current location of the unmanned vehicle 2 to the destination,
determining that the at least one route at least partly overlaps with a route defined for the first vehicle 3a, 3b, and
determining that the criterion is fulfilled.

It is again noted that in preferred embodiments, several routes including several vehicles are taken into account.

In various embodiments, transmitting 23 the information comprises transmitting one or more of: identification of the first vehicle 3a, 3b, docking location, undocking location, route from current location to a docking location and docking alternatives.

In various embodiments, the obtaining 21 route information comprises one or more of: polling information from one or more vehicles 3a, 3b, receiving information from one or more vehicles 3a, 3b, obtaining traffic information from a database and obtaining route information from a database, receiving information from the unmanned aerial vehicle 2, obtaining a destination for the unmanned aerial vehicle 2, obtaining a current location of the unmanned aerial vehicle 2.

In various embodiments, the route information comprises routes defined for one or more vehicles 3a, 3b, traffic information on traffic along routes, destination for the unmanned aerial vehicle 2, a current location of the unmanned aerial vehicle 2. There are many parameters that may affect e.g. possible time savings. Taking e.g. current traffic situation (traffic accidents, congestions etc.) into account may improve enabled time and energy savings.

Figure 4:
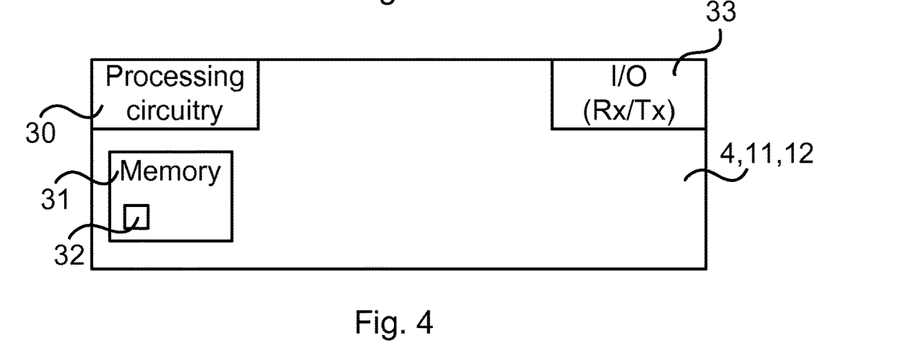
FIG. 4 illustrates schematically a network entity and means for implementing embodiments of the method in accordance with the present teachings.

FIG. 4 illustrates schematically a network entity and means for implementing embodiments of the method in accordance with the present teachings. The network entity 4, 11, 12 comprises processing circuitry 30, which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the network entity 4, 11, 12 to perform a set of operations, or steps, e.g. as described in relation to FIG. 2 or FIG. 3. For example, the storage medium 31 may store the set of operations, and the processing circuitry 30 may be configured to retrieve the set of operations from the storage medium 31 to cause the network entity 4, 11, 12 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

The network entity 4, 11, 12 may also comprise an input/output device 33 for communicating with other entities and devices. The input/output device 33 may be an interface and may, for instance, comprise a protocol stack, for communication with other devices or entities. The input/output device 33 may be used for receiving data input and for outputting data, and/or receiving/transmitting wireless signaling.

A network entity 4, 11, 12 is provided for directing an unmanned aerial vehicle 2 to a destination. The network entity 4, 11, 12 is configured to:
obtain route information for at least a first vehicle 3a, 3b and for the unmanned aerial vehicle 2,
establish, based on the route information, that a criterion for co-traveling with the first vehicle 3a, 3b is fulfilled, and
transmit, to the unmanned vehicle 2, information enabling the unmanned aerial vehicle 2 to co-travel with the first vehicle 3a, 3b.

The network entity 4, 11, 12 may be configured to perform the above steps e.g. by comprising processing circuitry 30 and memory 31, the memory 31 containing instructions executable by the processing circuitry 30, whereby the network entity 4, 11, 12 is operative to perform the steps. That is, in an embodiment, a network entity 4, 11, 12 is provided. The network entity 4, 11, 12 comprises processing circuitry 30 and memory 31, the memory 31 containing instructions executable by the processing circuitry 30, whereby network entity 4, 11, 12 is operative to: obtain route information for at least a first vehicle and for the unmanned aerial vehicle, establish, based on the route information, that a criterion for co-traveling with the first vehicle is fulfilled, and transmit, to the unmanned vehicle, information enabling the unmanned aerial vehicle to co-travel with the first vehicle.

In some embodiments, the network entity 4, 11, 12 is configured to establish by determining that one or both of a time saving and energy saving is obtained when co-traveling with the first vehicle 3a, 3b for at least part of remaining distance to the destination.

In various embodiments, the network entity 4, 11, 12 is configured to establish by:
calculating at least one route from a current location of the unmanned vehicle 2 to the destination,
determining that the at least one route at least partly overlaps with a route defined for the first vehicle 3a, 3b, and
determining that the criterion is fulfilled.

In various embodiments, the network entity 4, 11, 12 is configured to transmit one or more of: identification of the first vehicle 3a, 3b, docking location, undocking location, route from current location to a docking location and docking alternatives.

In various embodiments, the network entity 4, 11, 12 is configured to obtain the route information by one or more of: polling information from one or more vehicles 3a, 3b, receiving information from one or more vehicles 3a, 3b, obtaining traffic information from a database and obtaining route information from a database, receiving information from the unmanned aerial vehicle 2, obtaining a destination for the unmanned aerial vehicle 2, obtaining a current location of the unmanned aerial vehicle 2.

In various embodiments, route information comprises routes defined for one or more vehicles 3a, 3b, traffic information on traffic along routes, destination for the unmanned aerial vehicle 2, a current location of the unmanned aerial vehicle 2.

The present teachings also encompass a computer program 32 for a network entity 4, 11, 12 for directing an unmanned aerial vehicle 2 to a destination. The computer program 32 comprises computer program code, which, when executed on at least one processor on the network entity 4, 11, 12, causes the network entity 4, 11, 12 to perform the method according to any of the described embodiments.

The present teachings also encompass computer program products 31 for a network entity 4, 11, 12 for directing an unmanned aerial vehicle 2 to a destination. The computer program product 31 comprises the computer program 32 for implementing the embodiments of the methods as described, and a computer readable means on which the computer program 32 is stored. The computer program product, or the memory, thus comprises instructions executable by the processor 30. Such instructions may be comprised in a computer program, or in one or more software modules or function modules. The computer program product 31 may be any combination of random access memory (RAM) or read only memory (ROM), Flash memory, magnetic tape, Compact Disc (CD)-ROM, digital versatile disc (DVD), Blu-ray disc etc.

Figure 5:
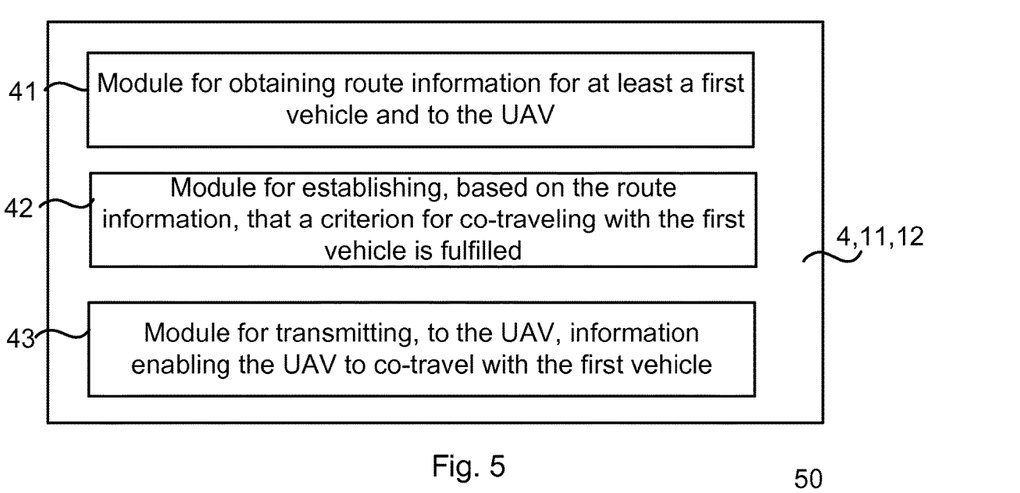
FIG. 5 illustrates a network entity comprising function modules/software modules for implementing embodiments in accordance with the present teachings.

FIG. 5 illustrates a network entity comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

The network entity 4, 11, 12 comprises a first module 41 for obtaining route information for at least a first vehicle and for the unmanned aerial vehicle. The first module 41 may, for instance, comprise processing circuitry adapted for obtaining route information, and/or receiving circuitry for receiving route information.

The network entity 4, 11, 12 comprises a second module 42 for establishing, based on the route information, that a criterion for co-traveling with the first vehicle 3a, 3b is fulfilled. The second module 42 may, for instance, comprise processing circuitry adapted to establish the fulfilment of the criterion. As a particular example, the second module 42 may comprise processing circuitry adapted to determine fulfilment of a criterion by performing a comparison.

The network entity 4, 11, 12 comprises a third module 43 for transmitting, to the unmanned vehicle 2, information enabling the unmanned aerial vehicle 2 to co-travel with the first vehicle 3a, 3b. The third module 43 may, for instance, comprise transmitting circuitry.

It is noted that one or more of the modules 41, 42, 43 may be replaced by units.

Figure 6:
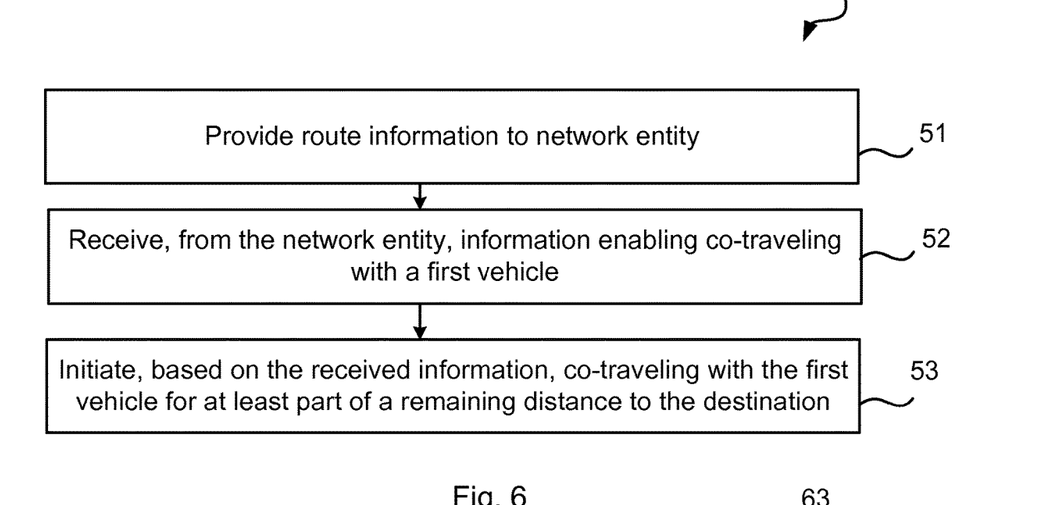
FIG. 6 illustrates a flow chart over steps of an embodiment of a method in an unmanned aerial vehicle in accordance with the present teachings.

FIG. 6 illustrates a flow chart over steps of an embodiment of a method in an unmanned aerial vehicle in accordance with the present teachings.

A method 50 is provided, that may be performed in an unmanned aerial vehicle 2 for increased efficiency in reaching a destination. The method 50 comprises providing 51 route information to a network entity 4, 11, 12. As mentioned earlier, the unmanned aerial vehicle 2 may be provided with a communication unit for wireless transmission with a radio access node, and the unmanned aerial vehicle 2 may thereby provide the information to the network entity.

The method 50 comprises receiving 52, from the network entity 4, 11, 12, information enabling co-traveling with a first vehicle 3a, 3b.

The method 50 comprises initiating 53, based on the received information, co-traveling with the first vehicle 3a, 3b for at least part of a remaining distance to the destination.

In some embodiments, the receiving 52 comprises receiving instructions for reaching the first vehicle 3a, 3b, the instructions comprising one or more of: location of the first vehicle 3a, 3b at which to attach to the first vehicle 3a, 3b, route to a location of the first vehicle 3a, 3b at which to attach to the first vehicle 3a, 3b and information relating to attachment procedure.

In some embodiments, the initiating 53 comprises changing route towards a location at which to attach to the first vehicle 3a, 3b.

Figure 7:
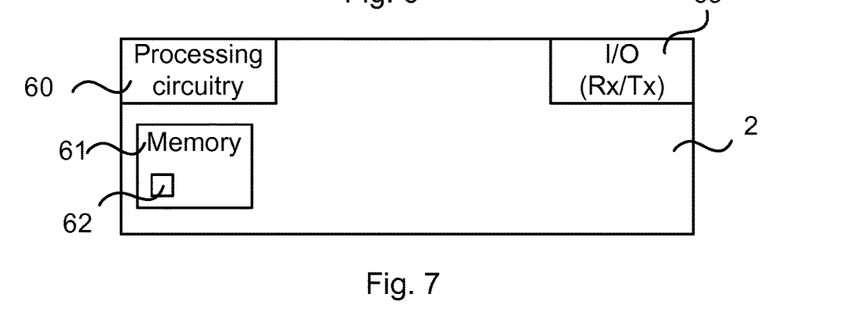
FIG. 7 illustrates schematically an unmanned aerial vehicle and means for implementing embodiments in accordance with the present teachings.

FIG. 7 illustrates schematically an unmanned aerial vehicle and means for implementing embodiments in accordance with the present teachings.

The unmanned aerial vehicle 2 may be provided with a communication unit such that it is able to communicate in a communications system 1 (as described e.g. in relation to FIG. 1). In FIG. 7 such communication unit is exemplified as an input/output device 63. The input/output device 63 may be an interface and may, for instance, comprise a protocol stack, for communication with other devices or entities. The input/output device 63 may be used for receiving data input and for outputting data, and/or receiving/transmitting wireless signaling.

The unmanned aerial vehicle 2 comprises processing circuitry 60, which may be any combination of one or more of a suitable central processing unit (CPU), multiprocessor, microcontroller, digital signal processor (DSP), etc., capable of executing software instructions stored in a computer program product 61, e.g. in the form of a storage medium 61. The processing circuitry 60 may further be provided as at least one application specific integrated circuit (ASIC), or field programmable gate array (FPGA).

The processing circuitry 60 is configured to cause the unmanned aerial vehicle 2 to perform a set of operations, or steps, e.g. as described in relation to FIG. 5. For example, the storage medium 61 may store the set of operations, and the processing circuitry 60 may be configured to retrieve the set of operations from the storage medium 61 to cause the unmanned aerial vehicle 2 to perform the set of operations. The set of operations may be provided as a set of executable instructions. The processing circuitry 60 is thereby arranged to execute methods as disclosed herein.

The storage medium 61 may also comprise persistent storage, which, for example, can be any single one or combination of magnetic memory, optical memory, solid state memory or even remotely mounted memory.

An unmanned aerial vehicle 2 is provided for increased efficiency in reaching a destination. The unmanned aerial vehicle 2 is configured to:
provide route information to a network entity 4, 11, 12,
receive, from the network entity 4, 11, 12, information enabling co-traveling with a first vehicle 3a, 3b, and
initiate, based on the received information, co-traveling with the first vehicle 3a, 3b for at least part of a remaining distance to the destination.

The unmanned aerial vehicle 2 may be configured to perform the above steps e.g. by comprising processing circuitry 60 and memory 61, the memory 61 containing instructions executable by the processing circuitry 60, whereby the unmanned aerial vehicle 2 is operative to perform the steps. That is, in an embodiment, a unmanned aerial vehicle 2 is provided. The unmanned aerial vehicle 2 comprises processing circuitry 60 and memory 61, the memory 61 containing instructions executable by the processing circuitry 60, whereby unmanned aerial vehicle is operative to: provide route information to a network entity, receive, from the network entity information enabling co-traveling with a first vehicle, and initiate, based on the received information, co-traveling with the first vehicle for at least part of a remaining distance to the destination.

In an embodiment, the unmanned aerial vehicle 2 is, configured to receive instructions for reaching the first vehicle 3a, 3b, the instructions comprising one or more of: location of the first vehicle 3a, 3b at which to attach to the first vehicle 3a, 3b, route to a location of the first vehicle 3a, 3b at which to attach to the first vehicle 3a, 3b and information relating to attachment procedure.

In an embodiment, the unmanned aerial vehicle 2 is, configured to initiate by changing route towards a location at which to attach to the first vehicle 3a, 3b.

Figure 8:
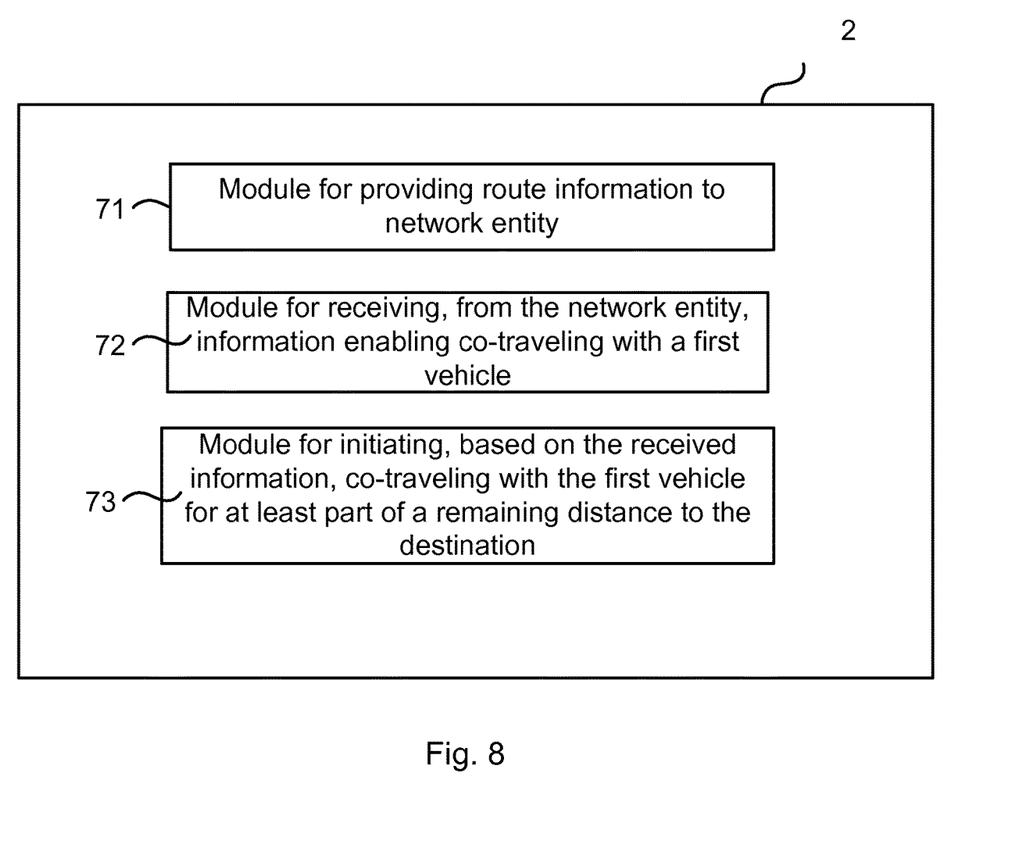
FIG. 8 illustrates an unmanned aerial vehicle comprising function modules/software modules for implementing embodiments of the present teachings.

FIG. 8 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

An unmanned aerial vehicle 2 is provided for increased efficiency in reaching a destination. The unmanned aerial vehicle 2 comprises a first module 71 for providing route information to a network entity 4, 11, 12. Such first module 71 may, for instance, comprise transmitting circuitry or an output device.

The unmanned aerial vehicle 2 comprises a second module 72 for receiving, from the network entity, information enabling co-traveling with a first vehicle. Such second module 72 may, for instance, comprise receiving circuitry or an input device.

The unmanned aerial vehicle 2 comprises a third module 73 for initiating, based on the received information, co-traveling with the first vehicle for at least part of a remaining distance to the destination. Such second module 72 may, for instance, comprise processing circuitry adapted for initiating co-traveling with vehicles.

Methods and entities are disclosed, wherein a network entity evaluates, based on information on drone routes and vehicle routes (both unmanned and manned), if a drone can benefit from co-traveling with or placing its cargo on other vehicles. If so, the network signals the new routes to the drone and the corresponding vehicles.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network entity for directing an unmanned aerial vehicle (UAV) to a destination, the method comprising:
   obtaining route information for a first vehicle, the route information identifying a route that the first vehicle is traveling or will be travelling;
   obtaining destination information identifying the location of the destination;
   using i) the route information identifying the route that the first vehicle is traveling or will be travelling and ii) the destination information, determining whether or not the first vehicle should transport the UAV; and
   as a result of determining that the first vehicle should transport the UAV, transmitting, to the UAV, information configuring the UAV to travel to the first vehicle and attach itself to the first vehicle so that the first vehicle is operable to transport the UAV.

2. The method of claim 1, wherein determining whether or not the first vehicle should transport the UAV comprises determining that one or both of a time saving and energy saving is obtained when the first vehicle transports the UAV for at least part of remaining distance to the destination.

3. The method of claim 1, wherein determining whether or not the first vehicle should transport the UAV comprises:
   calculating at least one route from a current location of the UAV to the destination,
   determining that the at least one route at least partly overlaps with a route defined for the first vehicle, and
   determining that that the first vehicle should transport the UAV.

4. The method of claim 1, wherein transmitting the information comprises transmitting one or more of: an identification of the first vehicle, a docking location, an undocking location, a route from a current location of the UAV to a docking location, or docking alternatives.

5. The method of claim 1, wherein obtaining the route information comprises one or more of: polling information from one or more vehicles, receiving information from one or more vehicles, obtaining traffic information from a database and obtaining route information from a database, receiving information from the UAV, obtaining a destination for the UAV, or obtaining a current location of the UAV.

6. The method of claim 1, wherein the route information comprises any one or more of routes defined for one or more vehicles, traffic information on traffic along routes, destination for the UAV, or a current location of the UAV.

7. A computer program product comprising a non-transitory computer readable medium storing a computer program for a network entity, the computer program comprising computer program code, which, when run on processing circuitry of the network entity causes the network entity to perform the method of claim 1.

8. A network entity for directing an unmanned aerial vehicle (UAV) to a destination, the network entity being configured to:
   obtain route information for a first vehicle, the route information identifying a route that the first vehicle is traveling or will be travelling;
   obtain destination information identifying the location of the destination;
   using i) the route information identifying the route that the first vehicle is traveling or will be travelling and ii) the destination information, determine whether or not the first vehicle should transport the UAV; and
   as a result of determining that the first vehicle should transport the UAV, transmit, to the UAV, information configure the UAV to travel to the first vehicle and attach itself to the first vehicle so that the first vehicle is operable to transport the UAV.

9. The network entity of claim 8, configured to determine whether or not the first vehicle should transport the UAV by determining that one or both of a time saving and energy saving is obtained when the first vehicle transports the UAV for at least part of remaining distance to the destination.

10. The network entity of claim 8, wherein determining whether or not the first vehicle should transport the UAV comprises:
    calculating at least one route from a current location of the UAV to the destination,
    determining that the at least one route at least partly overlaps with a route defined for the first vehicle, and
    determining that that the first vehicle should transport the UAV.

11. The network entity of claim 8, further configured to transmit one or more of: an identification of the first vehicle, a docking location, an undocking location, a route from a current location of the UAV to a docking location, or docking alternatives.

12. The network entity of claim 8, wherein obtaining the route information comprises one or more of: polling information from one or more vehicles, receiving information from one or more vehicles, obtaining traffic information from a database and obtaining route information from a database, receiving information from the UAV, obtaining a destination for the UAV, or obtaining a current location of the UAV.

13. The network entity of claim 8, wherein the route information comprises any one or more of routes defined for one or more vehicles, traffic information on traffic along routes, destination for the UAV, or a current location of the UAV.

14. A method performed in an unmanned aerial vehicle (UAV) for increased efficiency in reaching a destination, the method comprising:
   providing route information to a network entity, wherein the route information identifies a route that the UAV is traveling or will be travelling;
   receiving, from the network entity, information configuring the UAV to travel to a first vehicle and attach itself to the first vehicle so that the first vehicle is operable to transport the UAV; and
   initiating, based on the received information, travelling to the first vehicle and attaching itself to the first vehicle.

15. The method of claim 14, wherein
   receiving the information comprises receiving instructions for reaching the first vehicle, and
   the instructions comprise one or more of: a location of the first vehicle at which the UAV can be attached to the first vehicle, a route to a location of the first vehicle at which the UAV can be attached to the first vehicle, or information relating to attachment procedure.

16. The method of claim 14, wherein the initiating comprises changing the route towards a location at which the UAV can be attached to the first vehicle.

17. A computer program product comprising a non-transitory computer readable medium storing a computer program for an unmanned aerial vehicle (UAV), the computer program comprising computer program code, which, when run on at processing circuitry of the UAV causes the UAV to perform the method of claim 14.

18. An unmanned aerial vehicle (UAV) for increased efficiency in reaching a destination, the UAV being configured to:
   provide route information to a network entity, wherein the route information identifies a route that the UAV is traveling or will be travelling;
   receive, from the network entity, information configuring the UAV to travel to a first vehicle and attach itself to the first vehicle so that the first vehicle is operable to transport the UAV; and
   initiate, based on the received information, travelling to the first vehicle and attaching itself to the first vehicle.

19. The UAV of claim 18, wherein
   receiving the information comprises receiving instructions for reaching the first vehicle, and
   the instructions comprise one or more of: a location of the first vehicle at which the UAV can be attached to the first vehicle, a route to a location of the first vehicle at which the UAV can be attached to the first vehicle or information relating to attachment procedure.

20. The UAV of claim 18, wherein the initiating comprises changing the route towards a location at which the UAV can be attached to the first vehicle.

21. The method of claim 1, wherein the information comprises an instruction configuring the UAV (i) to detach itself from the first vehicle and (ii) to travel by itself or to attach itself to a second vehicle so that the second vehicle is operable to transport the UAV.

* * * * *